(12) United States Patent
Narula et al.

(10) Patent No.: US 11,001,250 B2
(45) Date of Patent: May 11, 2021

(54) WASTE HEAT RECOVERY HYBRID POWER DRIVE

(71) Applicant: CUMMINS INC., Columbus, IN (US)

(72) Inventors: Manik Narula, Columbus, IN (US);
Timothy C. Ernst, Columbus, IN (US);
Michael J. Ruth, Franklin, IN (US);
Jonathan A. Dickson, Columbus, IN (US); J. Steven Kolhouse, Columbus, IN (US); Nimish Bagayatkar, Carmel, IN (US)

(73) Assignee: Cummins Inc., Columbus, IN (US)

( * ) Notice: Subject to any disclaimer, the term of this patent is extended or adjusted under 35 U.S.C. 154(b) by 479 days.

(21) Appl. No.: 15/909,578

(22) Filed: Mar. 1, 2018

(65) Prior Publication Data
US 2019/0270442 A1 Sep. 5, 2019

(51) Int. Cl.
| | |
|---|---|
| *B60K 1/00* | (2006.01) |
| *B60W 20/14* | (2016.01) |
| *B60W 30/18* | (2012.01) |
| *B60K 6/44* | (2007.10) |
| *B60K 6/26* | (2007.10) |
| *F01N 5/04* | (2006.01) |

(52) U.S. Cl.
CPC ............ *B60W 20/14* (2016.01); *B60K 6/26* (2013.01); *B60K 6/44* (2013.01); *B60W 30/18127* (2013.01); *F01N 5/04* (2013.01)

(58) Field of Classification Search
CPC ...... B60W 20/14; B60W 20/00; B60W 20/10; B60W 30/18127; B60K 6/44; B60K 6/26; B60K 6/20; B60K 6/42; B60K 6/48; B60K 25/00; F01N 5/04; F01N 5/02; F01N 5/00; F01N 3/0205; F01N 3/02; F01N 3/00; F01K 23/065; F01K 23/06; F01K 23/08; F01K 23/10; F01K 23/12; F01K 23/14
See application file for complete search history.

(56) References Cited

U.S. PATENT DOCUMENTS

| | | | | |
|---|---|---|---|---|
| 4,148,192 A * | 4/1979 | Cummings | ............... | F02G 5/04 |
| | | | | 60/716 |
| 6,450,283 B1 | 9/2002 | Taggett | | |
| 7,056,251 B2 * | 6/2006 | Ibaraki | ................... | B60K 6/442 |
| | | | | 475/5 |
| 7,520,133 B2 * | 4/2009 | Hoetger | ............... | F01K 23/065 |
| | | | | 60/618 |
| 8,141,360 B1 * | 3/2012 | Huber | ..................... | F02D 29/06 |
| | | | | 60/606 |

(Continued)

FOREIGN PATENT DOCUMENTS

WO  WO-2015/197087  12/2015

*Primary Examiner* — James M Dolak
(74) *Attorney, Agent, or Firm* — Foley & Lardner LLP

(57) ABSTRACT

A waste heat recovery (WHR) hybrid power system can be utilized in vehicles to convert heat energy into mechanical energy. The WHR system can include a WHR power unit structured to convert thermal energy into rotation of a WHR drive shaft. A motor/generator having a motor/generator shaft can selectively operate as a motor or a generator. A mechanical linkage can be structured to selectively link a output shaft to one of the WHR drive shaft and the motor/generator drive shaft independently of the other of the WHR drive shaft and the motor/generator drive shaft.

11 Claims, 2 Drawing Sheets

(56) References Cited

U.S. PATENT DOCUMENTS

| | | | | |
|---|---|---|---|---|
| 8,739,531 | B2 * | 6/2014 | Teng | F01K 13/02 |
| | | | | 60/618 |
| 8,881,523 | B2 * | 11/2014 | Kasuya | F01P 9/06 |
| | | | | 60/618 |
| 9,470,115 | B2 * | 10/2016 | Ernst | F01K 25/10 |
| 9,777,602 | B2 * | 10/2017 | Juchymenko | F01K 25/10 |
| 9,810,129 | B2 * | 11/2017 | Zhou | F02G 5/04 |
| 9,835,072 | B2 * | 12/2017 | Seo | F02B 67/10 |
| 9,862,262 | B2 * | 1/2018 | Martin | B60W 20/11 |
| 10,174,714 | B2 * | 1/2019 | Moller | B60W 20/00 |
| 10,279,676 | B2 * | 5/2019 | Zhou | F02M 26/41 |
| 10,427,528 | B2 * | 10/2019 | Lerch | B60L 50/16 |
| 10,787,935 | B2 * | 9/2020 | Kardos | F01K 23/065 |
| 10,815,931 | B2 * | 10/2020 | Ernst | F02M 26/33 |
| 10,830,121 | B2 * | 11/2020 | Kardos | F01K 9/003 |
| 10,871,098 | B2 * | 12/2020 | Kim | F27D 17/004 |
| 10,876,497 | B2 * | 12/2020 | Munevar | F01N 5/02 |
| 2013/0056992 | A1 | 3/2013 | Wada et al. | |
| 2016/0326914 | A1 | 11/2016 | Bagayatkar | |
| 2017/0058745 | A1 | 3/2017 | Seo | |

* cited by examiner

WASTE HEAT RECOVERY HYBRID POWER DRIVE

STATEMENT OF FEDERALLY SPONSORED RESEARCH OR DEVELOPMENT

This invention was made with Government support under DE-EE0007761 awarded by the United States Department of Energy. The Government has certain rights in this invention.

TECHNICAL FIELD

The present disclosure relates to waste heat recovery (WHR) systems, and in particular to WHR systems used with hybrid powertrains.

BACKGROUND

A WHR system may recovers heat energy that would otherwise be lost from an internal combustion engine. The more waste heat energy extracted by a WHR system, the greater the potential efficiency of the engine. In other words, rather than the extracted heat being lost, the extracted heat energy may be repurposed to, e.g., supplement the power output from the internal combustion engine thereby increasing the efficiency of the system.

SUMMARY

In one aspect, WHR hybrid power drive system includes a WHR power unit, a motor/generator, and a mechanical linkage. The WHR power unit is structured to convert thermal energy into rotation of a WHR drive shaft. The motor/generator is structured to selectively operate as a motor or a generator, the motor/generator having a motor/generator drive shaft. The mechanical linkage is coupled to the WHR drive shaft, the motor generator drive shaft, and an output shaft, and is structured to selectively link the output shaft to one of the WHR drive shaft and the motor/generator drive shaft independently of the other of the WHR drive shaft and the motor/generator drive shaft.

In one or more implementations, the system further includes a first decoupling device and a second decoupling device. The first decoupling device is coupled to the output shaft and the WHR drive shaft, the first decoupling device structured to allow rotation of the WHR drive at a speed that is different from a speed of rotation of the output shaft. The second decoupling device is coupled to the output shaft and the motor/generator drive shaft, the second decoupling device structured to allow rotation of the motor/generator drive at a speed that is different from the speed of rotation of the output shaft. In one or more implementations, the system further includes an expander structured to convert motion of a working fluid into the rotation of the WHR drive, and a feed pump structured to circulate the working fluid in a working fluid circuit. In one or more implementations, the motor/generator is structured to operate as the generator to convert rotation of the motor/generator drive shaft into electrical energy. In one or more implementations, the motor/generator is structured to operate as a motor to convert electrical energy received from an electrical power source into rotation of the motor/generator drive shaft. In one or more implementations, the mechanical linkage is structured to couple the WHR drive shaft to the output shaft to transfer power between the WHR power unit and the output shaft. In one or more implementations, the mechanical linkage is structured to couple the motor/generator drive shaft to the output shaft to transfer power between the motor/generator and the output shaft. In one or more implementations, the mechanical linkage includes at least one clutch. In one or more implementations, the mechanical linkage is further structured to link the WHR drive shaft to the motor/generator drive shaft. In one or more implementations, the mechanical linkage is further structured to transfer power from the output shaft simultaneously and proportionally to both the WHR drive shaft and the motor/generator drive shaft.

In yet another aspect, a method comprises providing a WHR hybrid power drive system including a WHR power unit structured to convert thermal energy into rotation of a WHR drive shaft, a motor/generator structured to selectively operate as a motor or a generator, the motor/generator having a motor/generator drive shaft, and a mechanical linkage coupled to the WHR drive shaft, the motor/generator drive shaft, and an output shaft. The method further includes controlling the mechanical linkage to link the output shaft to the WHR drive shaft, thereby causing the rotation of the WHR drive shaft to be transferred to a rotation of the output shaft. The method also includes controlling the mechanical linkage to delink the output shaft from the WHR drive shaft. The method additionally includes controlling the mechanical linkage to link the output shaft to the motor/generator drive shaft, thereby causing a rotation of the output shaft to be transferred to a rotation of the motor/generator drive shaft.

In one or more implementations, the method further includes providing a first decoupling device coupled to the WHR drive shaft and the mechanical linkage, providing a second decoupling device coupled to the motor/generator drive shaft and the mechanical linkage, controlling the first decoupling device to allow rotation of the WHR drive at a speed that is different from a speed of rotation of the output shaft, and controlling the second decoupling device to allow rotation of the motor/generator drive shaft at a speed that is different from the speed of rotation of the output shaft. In one or more implementations, controlling the mechanical linkage to link the output shaft to the motor/generator drive shaft includes controlling the motor/generator to operate as a generator. In one or more implementations, the method further includes controlling the mechanical linkage to delink the output shaft from the motor/generator drive shaft, and controlling the mechanical linkage to link the WHR drive shaft to the motor/generator drive shaft, thereby allowing power transfer between the WHR drive shaft and the motor/generator drive shaft. In one or more implementations, the method further includes detecting that the vehicle is braking prior to controlling the mechanical linkage to delink the output shaft from the WHR drive shaft and controlling the mechanical linkage to link the output shaft to the motor/generator drive shaft. In one or more implementations, the method also includes operating the motor/generator as a generator, thereby converting mechanical energy from the output shaft into electrical energy to charge a battery. In one or more implementations, the method also includes controlling the mechanical linkage to link the output shaft to both the motor/generator drive shaft and the WHR drive shaft, thereby causing a rotation of the output shaft to be simultaneously and proportionally transferred to the rotation of the motor/generator drive shaft and the WHR drive shaft.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion assemblies and methods of operating internal combustion assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

WHR systems can recover thermal or other forms of energy that would otherwise be dissipated and lost to the environment, and help convert the energy into usable electrical or mechanical energy. In particular, the WHR systems can absorb heat generated by various components such as, for example, the engine or the exhaust. The WHR system can use the absorbed heat to impart motion to a heated working fluid, which, in turn, can drive or rotate a driving shaft. The driving shaft can be coupled to a final drive (such as, for example, wheels) or can be coupled to a drive shaft of a motor/generator that can convert the imparted torque into electrical energy. In hybrid powertrains, the WHR system can provide the electrical energy for charging a battery, which, in turn, can provide power to one or more electrical motors that drive the vehicle.

In some vehicles, the WHR system and the motor/generator are connected in series. That is, the WHR system drives the same shaft as the motor/generator, and the power generated by the WHR system is passed through the motor/generator before being provided to the drive shaft. This series connection can restrict the speed of the WHR system to the same speed as the motor/generator. In one approach, the WHR system can include a mechanical linkage that can disengage the WHR system and the motor/generator. In such an approach, any one of the WHR system and the motor/generator can drive the engine of the vehicle independently of the other.

Figure 1:
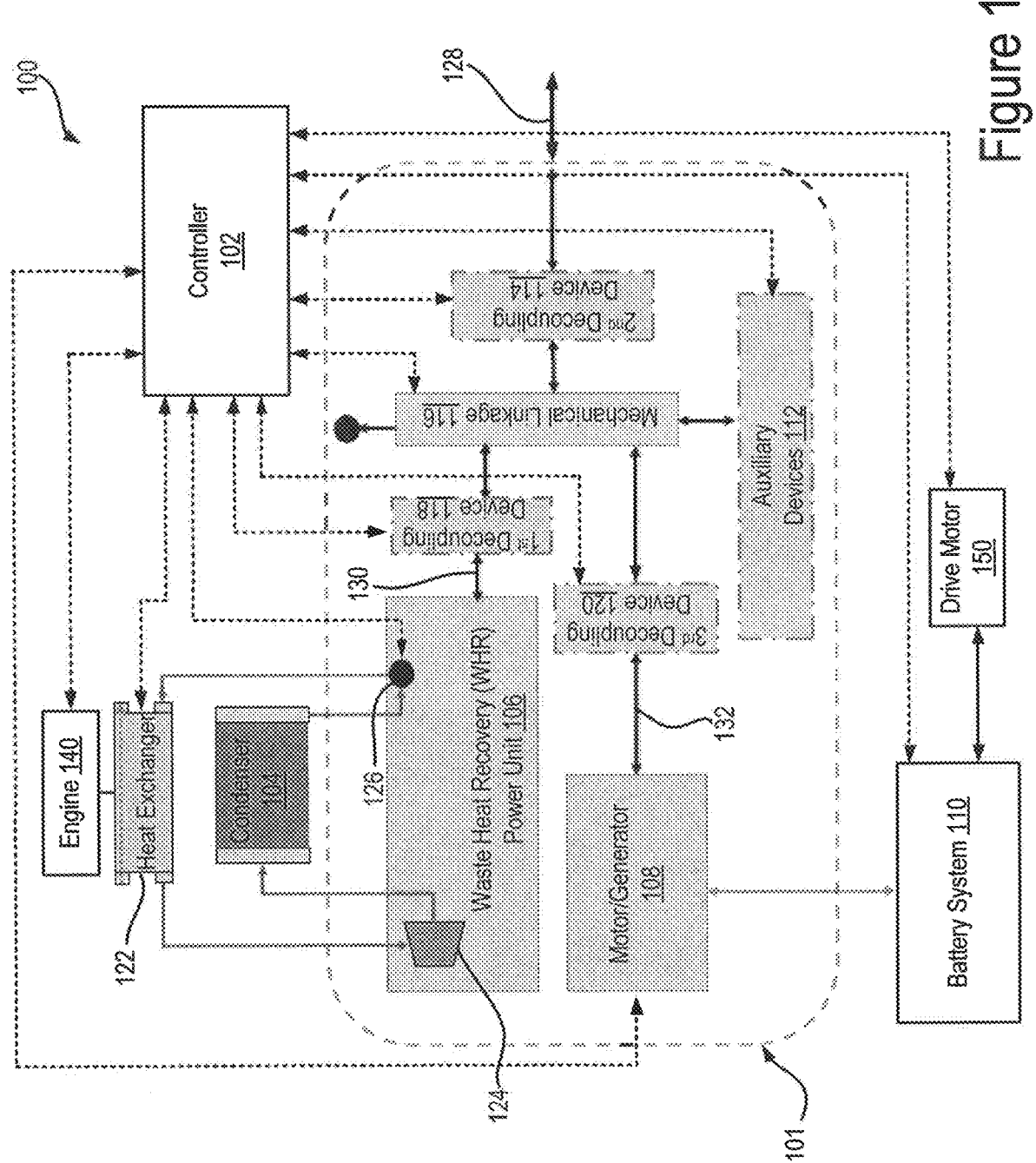
FIG. 1 shows an example WHR hybrid power drive system, according to an embodiment of the present disclosure.

FIG. 1 shows an example WHR hybrid power drive system 100. The WHR hybrid power drive system 100 includes a WHR-motor/generator hybrid power drive ("WHR-MG drive") 101, a controller 102, a heat exchanger 122, a condenser 104, a battery system 110, and a motor 150. The WHR hybrid power drive system 100 can be utilized in a vehicle, such as a hybrid vehicle. In such a hybrid vehicle, power to the output shaft of the vehicle can be provided by an engine 140, or an electrical motor, such as the motor 150. The WHR-MG drive 101 can recover thermal energy and convert the recovered thermal energy into electrical or mechanical energy. The electrical or mechanical energy can be provided to drive the vehicle.

The WHR-MG drive 101 can include a WHR power unit 106, which includes an expander 124 and a feed pump 126. The WHR-MG drive 101 also includes a motor/generator 108, and a mechanical linkage 116. The WHR-MG drive 101 may optionally include a first decoupling device 118, a second decoupling device 114, a third decoupling device 120, and auxiliary devices 112. The expander 124 and the feed pump 126 are in fluid communication with the heat exchanger 122 and the condenser 104. In particular, the expander 124, the condenser 104, the feed pump 126, and the heat exchanger 122 form a Rankine cycle waste heat recovery system or an organic Rankine cycle if the working fluid is an organic high molecular mass fluid with a liquid-vapor phase change that is lower than the water-steam phase change. Examples of Rankine cycle working fluids, organic and inorganic, include Genetron™ R-245fa or Solstice™ R1233zd(E) from Honeywell, Therminol™, Dowtherm J™ from Dow Chemical Co., Fluorinol® from American Nickeloid, toluene, dodecane, isododecane, methylundecane, neopentane, neopentane, octane, water/methanol mixtures, or steam.

The expander 124 is positioned downstream of the heat exchanger 122, and receives a working fluid that has absorbed heat energy in the heat exchanger 122. The heat exchanger 122 provides heat transfer from one or more heat sources in the vehicle to the working fluid. The heat sources can include, for example, exhaust gas produced by the engine 140, heat generated at the brake-pads/rotors, and heat produced by the motor 150 or the engine 140. The expander 124 can include a turbine, a piston, a screw, and the like, and can convert the motion of the working fluid into rotational motion of a WHR-MG drive shaft 130. The condenser 104 is coupled downstream of the expander 124, and provides cooling to the working fluid provided by the expander 124. The output of the condenser 104 is coupled to the feed pump 126, which, when activated, circulates the working fluid within the working fluid circuit. The feed pump 126 can be provided power from several sources. For example, the feed pump 126 can be coupled to the WHR-MG drive shaft 130, which is driven by the expander 124. In another example, the feed pump 126 can be coupled to an output shaft 128 via the mechanical linkage 116 when the vehicle is running. In another example, the feed pump 126 can be driven by the motor/generator 108 also via the mechanical linkage 116. Alternatively, the feed pump 126 could be coupled to a battery that provides power to operate the feed pump 126.

The motor/generator 108 can operate as a motor or a generator. When operating as a motor, the motor/generator 108 converts electrical energy received from the battery system 110 into rotational motion of a motor/generator drive shaft 132. When operating as a generator, the motor/generator 108 converts rotational motion of the motor/generator drive shaft 132 into electrical energy, which is provided to the battery system 110. The battery system 110 can provide power to a motor 150, which can be coupled to the output shaft 128, or another drive shaft, such as the final drive shaft, to provide motion to the vehicle.

The WHR-MG drive 101 is coupled to the mechanical linkage 116 via the WHR-MG drive shaft 130. The rotational energy imparted onto the WHR-MG drive shaft 130 by the expander 124 can drive the mechanical linkage 116, which can include a clutch, or a similar device, that can selectively engage and disengage the WHR-MG drive shaft 130 from the output shaft 128 of the vehicle. Similarly, the mechanical linkage 116 can selectively engage and disengage the output shaft 128 from the motor/generator drive shaft 132, which is coupled to the motor/generator. The mechanical linkage 116 can independently couple any one of the WHR-MG drive shaft 130 and the motor/generator drive shaft 132 to the output shaft 128. This allows power transfer between the WHR power unit 106 and the output shaft 128 independently of the motor/generator 108, and similarly allows power transfer between the motor/generator 108 and the output shaft 128 independently of the WHR power unit 106. The mechanical linkage 116 can also couple the WHR-MG drive shaft 130 to the motor/generator drive shaft 132, and decouple both these drive shafts from the output shaft 128. This allows power transfer between the WHR power unit 106 and the motor/generator 108. For example, when the expander 124 is not producing shaft power, such as during vehicle startup or shutdown, the feed pump 126 can be driven by the motor/generator drive shaft 132. This can also allow pre-charging of the heat exchanger 122 with the working fluid.

As mentioned above, the WHR-MG drive 101 can optionally include the first decoupling device 118, the second decoupling device 114, and a third decoupling device 120. The first decoupling device 118 is positioned between the WHR power unit 106 and the mechanical linkage 116, the second decoupling device 114 is positioned between the mechanical linkage and the output shaft 128, and the third decoupling device 120 is positioned between the motor/generator 108 and the mechanical linkage 116. The first, second, and third decoupling devices 118, 114, and 120 can be variable speed decoupling devices such as a planetary gear arrangement with a clutch, or a variable speed traction drive with traction fluid, or belt drive arrangement with movable sheaves, which can create a variable turning ratio. The decoupling devices can allow variable speed rotation of the shafts coupled thereto. For example, the first decoupling device 118 can be configured to allow the WHR-MG drive shaft 130 to rotate at a speed that is different from a shaft coupling the first decoupling device to the mechanical linkage 116. Similarly, the second decoupling device 114 can be configured to allow the output shaft to rotate at a speed that is different from that of the shaft coupling the second decoupling device 114 to the mechanical linkage 116. Likewise, the third decoupling device 120 can be configured to allow the motor/generator drive shaft 132 to rotate at a speed that is different from that of a shaft coupling the third decoupling device 120 to the mechanical linkage 116. Including the first, second, and the third decoupling devices 118, 114, and 120 can allow the WHR-MG drive shaft 130, the output shaft 128, and the motor/generator drive shaft 132 to rotate at different speeds. This can be beneficial in operating both the WHR power unit 106 and the motor/generator 108 at their respective and different optimal speeds.

For each particular mass flowrate through the WHR expander 124 or for a particular inlet and outlet pressure, the optimal speed or rotation (of the WHR-MG drive shaft 130) for maximum efficiency or power for the WHR expander 124 may be different from the speed of rotation of the output shaft 128. Similarly, for a particular power or torque transfer for the motor/generator 108, the optimal speed of rotation of the motor/generator drive shaft 132 for maximum efficiency of the motor/generator 108 may be different from the speed of rotation of the output shaft 128. With independent control of rotational speed for both the WHR expander 124 and the motor/generator 108, the optimum system performance can be achieved.

The WHR-MG drive 101 can optionally also include auxiliary devices 112 such as pumps and motors. The auxiliary devices 112 can be coupled to the mechanical linkage 116, and can include pumps or motors that can provide lubrication and cooling to the WHR-MG drive 101. For example, the one or more auxiliary devices 112 can be coupled to the mechanical linkage 116 to receive power to pump or circulate lubricant and coolant to various components of the WHR-MG drive 101 such as the WHR power unit 106, the motor/generator 108, the mechanical linkage 116, the optional first, second, and third decoupling devices 118, 114, and 120.

The controller 102 controls the operation of the WHR hybrid power drive system 100. The controller 102 can include a processor, a microcontroller, an application specific integrated circuit, a field programmable program logic (FPGA), or any other circuit. While not shown, the controller can include or be coupled to a volatile memory, a non-volatile memory, data storage, input-output interface circuits, and user interface circuits. The controller 102 can be coupled to one or more sensors in the WHR hybrid power drive system 100 and one or more actuators and switches that can control the operation or change the configuration of one or more components of the system 100.

The controller 102 controls the operation of the WHR-MG drive 101 during startup of the vehicle. For example, the WHR power unit 106 may not produce any power before the vehicle is running and generating heat. In such instances, the WHR power unit 106 may not be able to sustain the working fluid circuit. The controller 102 can provide external mechanical or electrical power to the WHR power unit 106 to operate the feed pump 126. For example, the controller 102 controls the motor/generator 108 to operate as a motor by drawing power from the battery system 110 and rotating the motor/generator drive shaft 132. The controller 102 also controls the mechanical linkage 116 to mechanically link the motor/generator drive shaft 132 to the WHR-MG drive shaft 130, which is coupled to the feed pump 126. Thus, the mechanical energy generated by the motor/generator 108 is transferred to the feed pump 126, which causes the working fluid to circulate in the working fluid circuit. Alternatively, if the vehicle is in motion, the controller 102 can control the mechanical linkage 116 to instead couple the output shaft 128 to the WHR-MG drive shaft 130, thereby transferring the mechanical power from the rotating output shaft 128 to the feed pump 126. In yet another approach, the controller 102 can initiate providing electric power to the feed pump 126 via a battery circuit (such as the battery system 110) to start the feed pump 126. The controller 102 can maintain providing power to the WHR-MG drive shaft 130 until the WHR power unit 106 is self-sustaining. That is, the WHR power unit 106 is able to convert thermal energy into mechanical energy (by the expander 124), that is sufficient to operate the feed pump 126. Once the WHR power unit 106 operates in a self-sustaining mode, the controller 102 disengages any electrical power provided to the feed pump 126 and engages the WHR-MG drive shaft 130 to the output shaft 128 or to the motor/generator drive shaft 132, to transfer power generated by the WHR power unit 106.

When the WHR power unit 106 is generating power, the controller 102 can configure the mechanical linkage 116 such that the power generated by the WHR power unit 106 could be provided to either the output shaft 128 or to the motor/generator 108. To provide power to the output shaft 128, the controller 102 controls the mechanical linkage 116 to couple the WHR-MG drive shaft 130 to the output shaft 128. To provide power to the motor/generator 108 instead, the controller 102 controls the mechanical linkage 116 to couple the WHR-MG drive shaft 130 to the motor/generator drive shaft 132, and controls the motor/generator 108 to operate as a generator. Thus, the motor/generator 108 converts the mechanical power generated by the WHR power unit 106 into electrical energy, which is provided to the battery system 110.

The controller 102 can also initiate transfer of power from the output shaft 128 to the motor/generator 108. For example, the controller 102 controls the mechanical linkage 116 to couple the output shaft 128 to the motor/generator drive shaft 132 when the vehicle is in motion. The controller 102 controls the motor/generator 108 to operate as a generator, such that the motor/generator 108 converts mechanical power received from the output shaft 128 into electrical energy, which is provided to the battery system 110. In some instances, the controller 102 can initiate the transfer of power from the output shaft 128 to the motor/generator 108 during braking. That is, when the controller 102 detects the application of the brake, the controller 102 controls the mechanical linkage 116 to couple the output shaft 128 to the motor/generator drive shaft 132. Thus, power that may have otherwise been lost during braking is converted into electrical energy to charge the battery system 110.

In instances where the WHR-MG drive 101 includes the first, second, and the third decoupling devices 118, 114, and 120, the controller 102 can control these decoupling devices such that the motor/generator 108 and the WHR power unit 106 can operate at optimal speeds. For example, when transferring power between the WHR power unit 106 and the output shaft 128, the controller 102 controls one or both of the first decoupling device 118 and the second decoupling device 114 such that the speeds of rotations of the WHR-MG drive shaft 130 is different from the speed of rotation of the output shaft 128. In particular, the controller 102 ensures that the speed of the WHR-MG drive shaft 130 is maintained at the optimal speed. In another example, when transferring power between the motor/generator 108 and the output shaft 128, the controller 102 controls one or both of the second decoupling device 114 and the third decoupling device 120 such that the speeds of rotation of the WHR-MG drive shaft 130 and the output shaft 128 are different. In particular, the controller 102 ensures that the speed of the motor/generator drive shaft 132 is maintained at the optimal speed.

The controller 102 also can transfer power between the WHR power unit 106 and the motor/generator 108. For example, when the vehicle is not in motion, but the WHR power unit 106 is still generating power, the controller 102 can control the first decoupling device 118, the mechanical linkage 116 and the third decoupling device 120 to transfer power between the WHR-MG drive shaft 130 and the motor/generator drive shaft 132. The controller 102 can configure the first decoupling device 118 and the third decoupling device 120 such that the optimal speeds of the WHR-MG drive shaft 130 and the motor/generator drive shaft 132 can be maintained.

The controller 102 also can facilitate simultaneous transfer of power from one of the WHR-MG drive shaft 130, the motor/generator drive shaft 132, and the output shaft 128 to the other two of the WHR-MG drive shaft 130, the motor/generator drive shaft 132, and the output shaft 128. In particular, the controller 102 can control the mechanical linkage 116 such that the power is transferred simultaneously and proportionally. For example, when the WHR-MG drive shaft 130 is providing power, the controller 102 can control the mechanical linkage 116 to transfer a portion of the power from the WHR-MG drive shaft 130 to the output shaft 128 and another portion to the motor/generator drive shaft 132. In this manner, the WHR-MG drive shaft 130 can simultaneously provide power to the engine and charge the battery system 110. In a similar manner, the controller 102 can control the mechanical linkage 116 to transfer power from the motor/generator drive shaft 132 simultaneously and proportionally to both the WHR-MG drive shaft 130 and to the output shaft 128. In addition, the controller 102 can control the mechanical linkage 116 to transfer power from the output shaft 128 simultaneously and proportionally to both the WHR-MG drive shaft 130 and to the motor/generator drive shaft 132.

Figure 2:
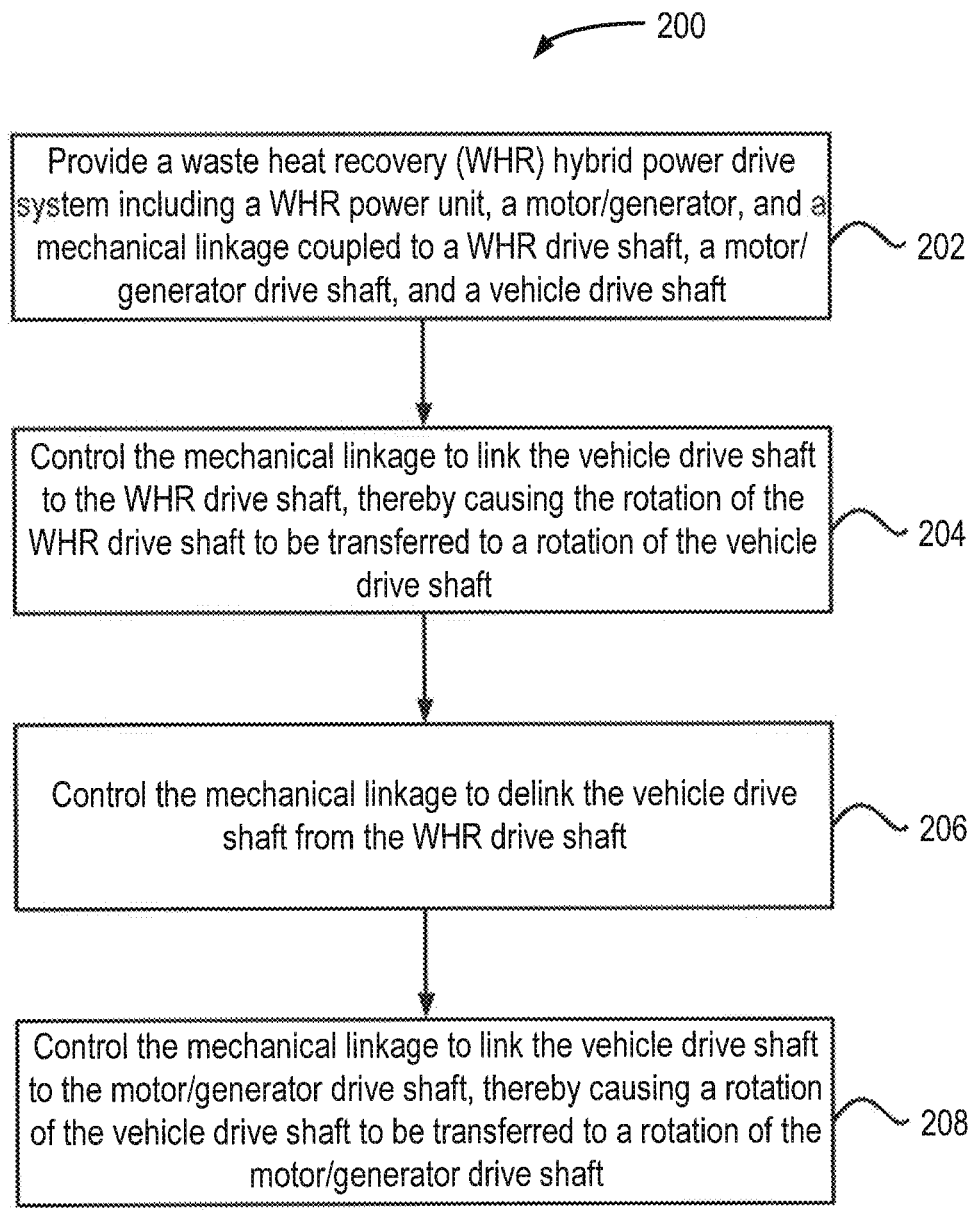
FIG. 2 shows a flow diagram of an example process for controlling a WHR hybrid power system, according to an embodiment of the present disclosure.

FIG. 2 shows a flow diagram of an example process 200 for controlling a WHR hybrid power system. The process 200 includes providing a waste heat recovery (WHR) hybrid power drive system comprising: a WHR power unit, a motor/generator, and a mechanical linkage coupled to a WHR drive shaft, a motor/generator drive shaft, and a output shaft (202). At least one example of this operation is discussed above in relation to FIG. 1. In particular, FIG. 1 shows a WHR-MG drive 101 that includes a WHR power unit 106, a motor/generator 108, and a mechanical linkage 116. The WHR power unit 106 is structured to convert thermal energy, obtained from the heat exchanger 122, into mechanical energy that manifests as rotation of the WHR-MG drive shaft 130. The motor/generator 108 is structured to operate as a motor or a generator and includes a motor/generator drive shaft. The mechanical linkage 116 can link or delink the output shaft 128 from the WHR-MG drive shaft 130 or the motor/generator drive shaft 132.

The process 200 further includes controlling the mechanical linkage to link the output shaft to the WHR drive shaft, thereby causing the rotation of the WHR drive shaft to be transferred to a rotation of the output shaft (204). At least one example of this operation is discussed above in relation to FIG. 1. For example, when the WHR power unit 101 is generating mechanical power, the controller 102 can control the mechanical linkage 116 to couple the WHR-MG drive shaft 130 to the output shaft 128. The controller 102 can control the mechanical linkage 116 when power is to be transferred from the WHR power unit 106 to the output shaft 128.

The process 200 also includes controlling the mechanical linkage to delink the output shaft from the WHR drive shaft (206). At least one example of this operation is discussed above in relation to FIG. 1. For example, the controller 102 can determine that the power from the output shaft 128 is transferred to the battery system 110. Therefore, the controller 102 can control the mechanical linkage 116 to delink the output shaft 128 from the WHR-MG drive shaft 130.

The process 200 further includes controlling the mechanical linkage to link the output shaft to the motor/generator drive shaft, thereby causing a rotation of the output shaft to be transferred to a rotation of the motor/generator drive shaft (208). At least one example of this operation is discussed above in relation to FIG. 1. For example, the controller 102, after controlling the mechanical linkage 116 to delink the output shaft 128 from the WHR-MG drive shaft 130, can control the mechanical linkage 116 to link the output shaft 128 to the motor/generator drive shaft 132. Therefore, the rotation of the output shaft 128 will be transferred to the rotation of the motor/generator drive shaft 132. The controller 102 also can control the motor/generator 108 to operate as a generator, thereby causing the mechanical energy provided to the motor/generator 108 by the rotation of the motor/generator drive shaft 132 into electrical energy, which can be provided to the battery system 110.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A waste heat recovery (WHR) hybrid power drive system, comprising:
   a WHR power unit structured to convert thermal energy into rotation of a WHR drive shaft;
   a motor/generator structured to selectively operate as a motor or a generator, the motor/generator having a motor/generator drive shaft;
   a first decoupling device operatively coupled to an output shaft and the WHR drive shaft;
   a second decoupling device operatively coupled to the output shaft and the motor/generator drive shaft; and
   a mechanical linkage operatively coupled to the WHR drive shaft, the motor/generator drive shaft, and the output shaft, the mechanical linkage structured to perform each of:
   decouple the first decoupling device and couple to the second decoupling device;
   and decouple the second decoupling device and couple to the first decoupling device.

2. The system of claim 1, wherein the first decoupling device is structured to allow rotation of the WHR drive at a speed that is different from a speed of rotation of the output shaft; and the second decoupling device is structured to allow rotation of the motor/generator drive at a speed that is different from the speed of rotation of the output shaft.

3. The system of claim 1, wherein the WHR power unit comprises:
   an expander structured to convert motion of a working fluid into the rotation of the WHR drive, and
   a feed pump structured to circulate the working fluid in a working fluid circuit.

4. The system of claim 1, wherein the motor/generator is structured to operate as the generator to convert rotation of the motor/generator drive shaft into electrical energy.

5. The system of claim 1, wherein the motor/generator is structured to operate as a motor to convert electrical energy received from an electrical power source into rotation of the motor/generator drive shaft.

6. The system of claim 1, wherein the mechanical linkage is structured to couple the WHR drive shaft to the output shaft to transfer power between the WHR power unit and the output shaft.

7. The system of claim 1, wherein the mechanical linkage is structured to couple the motor/generator drive shaft to the output shaft to transfer power between the motor/generator and the output shaft.

8. The system of claim 1, wherein the mechanical linkage includes at least one clutch.

9. The system of claim 1, wherein the mechanical linkage is further structured to link the WHR drive shaft to the motor/generator drive shaft.

10. The system of claim 1, wherein the mechanical linkage is further structured to transfer power from the output shaft simultaneously and proportionally to both the WHR drive shaft and the motor/generator drive shaft.

11. A waste heat recovery (WHR) hybrid power drive system, comprising:
- a WHR power unit structured to convert thermal energy into rotation of a WHR drive shaft;
- a motor/generator structured to selectively operate as a motor or a generator, the motor/generator having a motor/generator drive shaft;
- a first decoupling device operatively coupled to an output shaft, the motor/generator drive shaft and the WHR drive shaft;
- a second decoupling device operatively coupled to the output shaft, the motor/generator drive shaft and the WHR drive shaft; and
- a mechanical linkage operatively coupled to the WHR drive shaft, the motor/generator drive shaft, and the output shaft, the mechanical linkage structured to perform each of:

operatively decouple the first decoupling device from the output shaft and operatively couple the first decoupling device to the second decoupling device; and operatively decouple the second decoupling device from the output shaft and operatively couple the second decoupling device to the first decoupling device.

\* \* \* \* \*